US012715657B2

(12) United States Patent
Ritondo

(10) Patent No.: US 12,715,657 B2
(45) Date of Patent: Aug. 25, 2026

(54) FLEXIBLE BAG HAVING A CONVERTIBLE BOTTOM, METHOD AND MACHINE FOR MANUFACTURING SAME

(71) Applicant: HOLWEG GROUP, Molsheim (FR)

(72) Inventor: Cédric Ritondo, Molsheim (FR)

(73) Assignee: Holweg Group, Molsheim (FR)

( * ) Notice: Subject to any disclaimer, the term of this patent is extended or adjusted under 35 U.S.C. 154(b) by 112 days.

(21) Appl. No.: 18/560,236

(22) PCT Filed: May 9, 2022

(86) PCT No.: PCT/EP2022/062438

§ 371 (c)(1),
(2) Date: Nov. 10, 2023

(87) PCT Pub. No.: WO2022/238301

PCT Pub. Date: Nov. 17, 2022

(65) Prior Publication Data

US 2024/0239558 A1 Jul. 18, 2024

(30) Foreign Application Priority Data

May 12, 2021 (FR) ....................................... 2105064
Jun. 1, 2021 (FR) ....................................... 2105765

(51) Int. Cl.
*B65D 33/02* (2006.01)
*B31B 70/00* (2017.01)
(Continued)

(52) U.S. Cl.
CPC ............ *B65D 33/02* (2013.01); *B31B 70/008* (2017.08); *B31B 70/14* (2017.08); *B31B 70/266* (2017.08);
(Continued)

(58) Field of Classification Search
CPC ...... B65D 33/08; B65D 31/10; B65D 31/005; B31B 70/00; B31B 70/62; B31B 70/266; B31B 70/14; B31B 70/008
See application file for complete search history.

(56) References Cited

U.S. PATENT DOCUMENTS

| | | | | |
|---|---|---|---|---|
| 687,679 A | | 11/1901 | Eisenbeis | |
| 775,268 A | * | 11/1904 | Willis ................. | B65D 75/008 383/122 |

(Continued)

FOREIGN PATENT DOCUMENTS

| | | |
|---|---|---|
| DE | 951899 C | 11/1956 |
| EP | 0605931 A1 | 7/1994 |

(Continued)

OTHER PUBLICATIONS

International Search Report and Written Opinion of International Application No. PCT/EP2022/062438 dated Sep. 5, 2022, 14 pages (English Translation of International Search Report included).

(Continued)

*Primary Examiner* — Andrew M Tecco
*Assistant Examiner* — Nicholas E Igbokwe
(74) *Attorney, Agent, or Firm* — Andrus Intellectual Property Law, LLP

(57) ABSTRACT

A bag made of flexible material has a first and a second segment having cheeks along their selvages, the cheeks being joined together so as to form two gussets joining the segments together, one end of the bag perpendicular to the selvages being closed. The bag has a system of at least one reinforcing panel extending over a central part of the segments, between the gussets, each segment having a fold marking line, one opposite the other, in order to delimit a bottom at the closed end. Method and machine for manufacturing such a bag.

9 Claims, 14 Drawing Sheets

(51) Int. Cl.

| | |
|---|---|
| ***B31B 70/14*** | (2017.01) |
| ***B31B 70/26*** | (2017.01) |
| ***B31B 70/62*** | (2017.01) |
| ***B31B 160/10*** | (2017.01) |
| ***B65D 30/00*** | (2006.01) |
| ***B65D 30/20*** | (2006.01) |

(52) U.S. Cl.

CPC ............ *B31B 70/62* (2017.08); *B65D 31/005* (2013.01); *B65D 31/10* (2013.01); *B31B 2160/10* (2017.08)

(56) References Cited

U.S. PATENT DOCUMENTS

| | | | | | |
|---|---|---|---|---|---|
| 2,162,258 | A | | 6/1939 | Hultin | |
| 2,237,327 | A | * | 4/1941 | Bell | B31B 70/00 383/122 |
| 2,245,675 | A | * | 6/1941 | Hultin | B31B 70/00 383/122 |
| 2,730,934 | A | * | 1/1956 | Van Der Meulen | B31B 70/00 493/251 |
| 2,961,063 | A | * | 11/1960 | Fesco | A47L 9/14 383/122 |
| 3,051,103 | A | | 8/1962 | Williams | |
| 3,358,903 | A | * | 12/1967 | De Stefano | B65D 31/005 383/122 |
| 3,438,310 | A | | 4/1969 | Woodruff | |
| 3,596,443 | A | | 8/1971 | Goldberg | |
| 3,596,573 | A | | 8/1971 | Shrum | |
| 4,761,080 | A | * | 8/1988 | Schirmer | B65D 31/02 383/114 |
| 4,881,933 | A | | 11/1989 | Wech | |
| 5,006,186 | A | * | 4/1991 | Yokoyama | B31B 70/261 156/227 |
| 5,165,799 | A | * | 11/1992 | Wood | B29C 65/1483 383/104 |
| 6,059,912 | A | * | 5/2000 | Kellogg | B65F 1/1415 493/189 |
| 6,461,041 | B1 | * | 10/2002 | Simhaee | B65D 33/02 383/119 |
| 2020/0009818 | A1 | | 1/2020 | Walsh | |
| 2024/0239556 | A1 | | 7/2024 | Ritondo | |

FOREIGN PATENT DOCUMENTS

| | | | |
|---|---|---|---|
| EP | 2864114 | B1 | 6/2016 |
| EP | 3564146 | A1 | 11/2019 |
| FR | 786579 | A | 9/1935 |
| FR | 1120408 | A | 7/1956 |
| FR | 1270400 | A | 8/1961 |
| FR | 2054249 | A5 | 4/1971 |
| WO | 8301430 | | 4/1983 |
| WO | 8605442 | | 9/1986 |
| WO | 2016097310 | A1 | 6/2016 |
| WO | 2020049376 | A1 | 3/2020 |
| WO | 2020120616 | A1 | 6/2020 |
| WO | 2022238305 | A1 | 11/2022 |

OTHER PUBLICATIONS

International Search Report and Written Opinion of International Application No. PCT/EP2022/062444 mailed Aug. 25, 2022.

* cited by examiner

[Fig. 1]
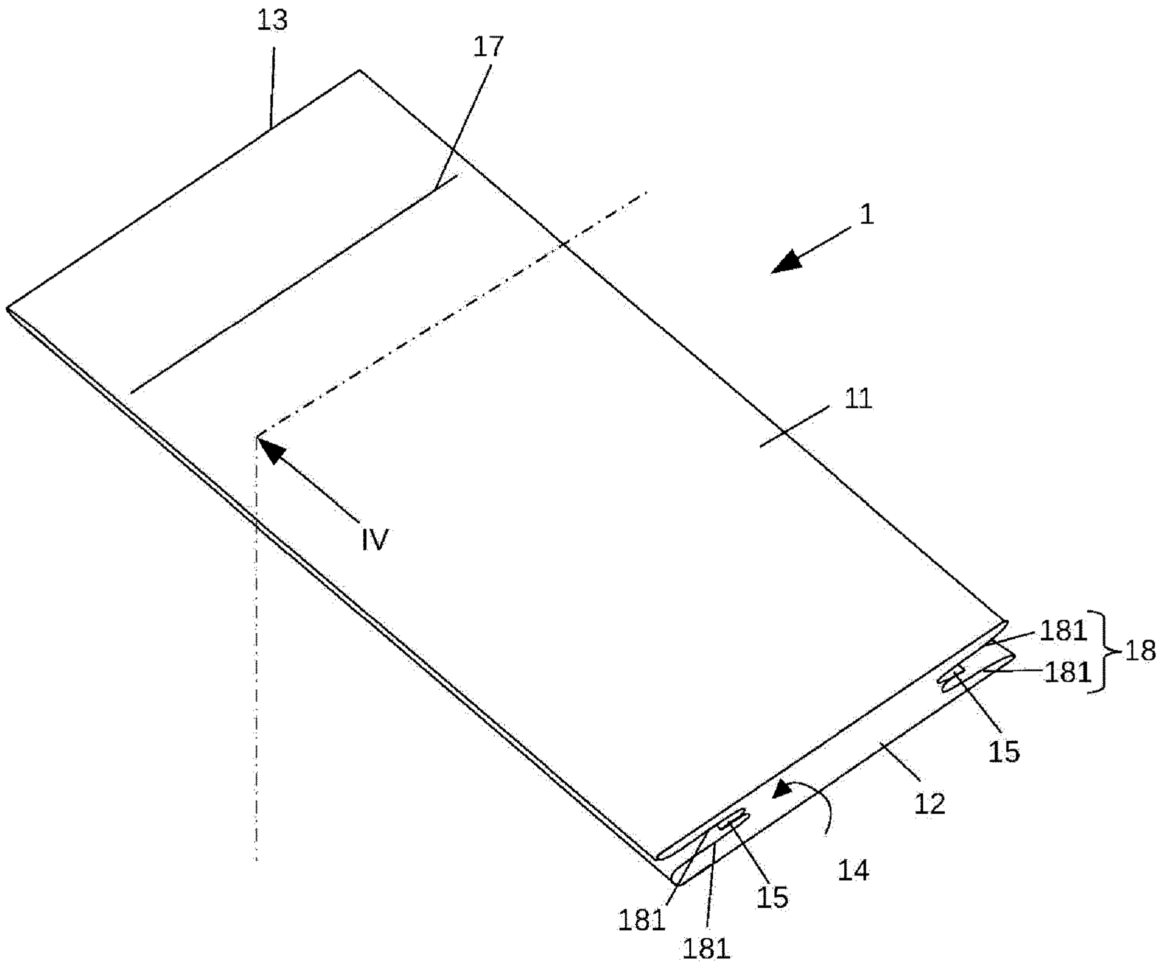

[Fig. 2]
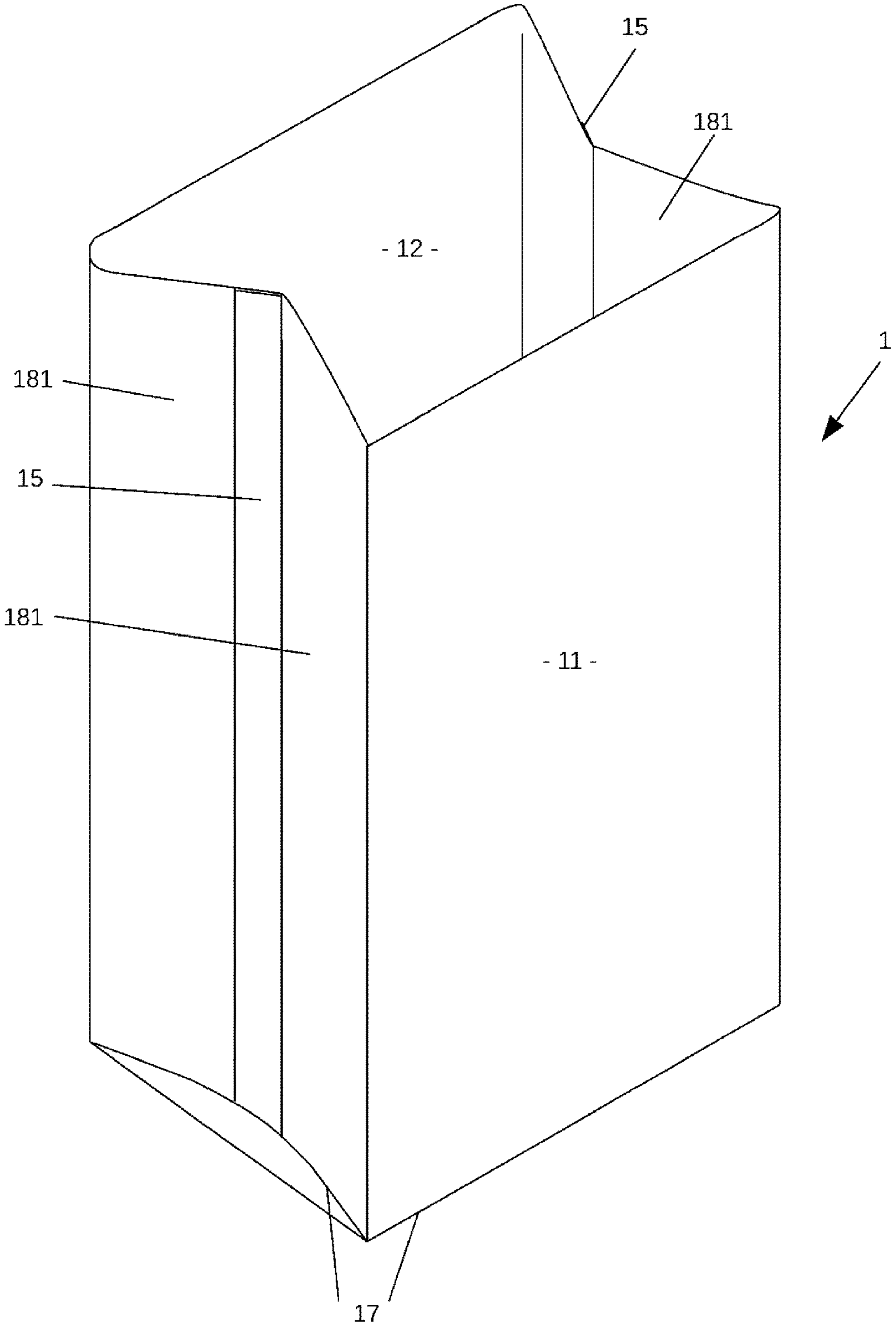

[Fig. 3]
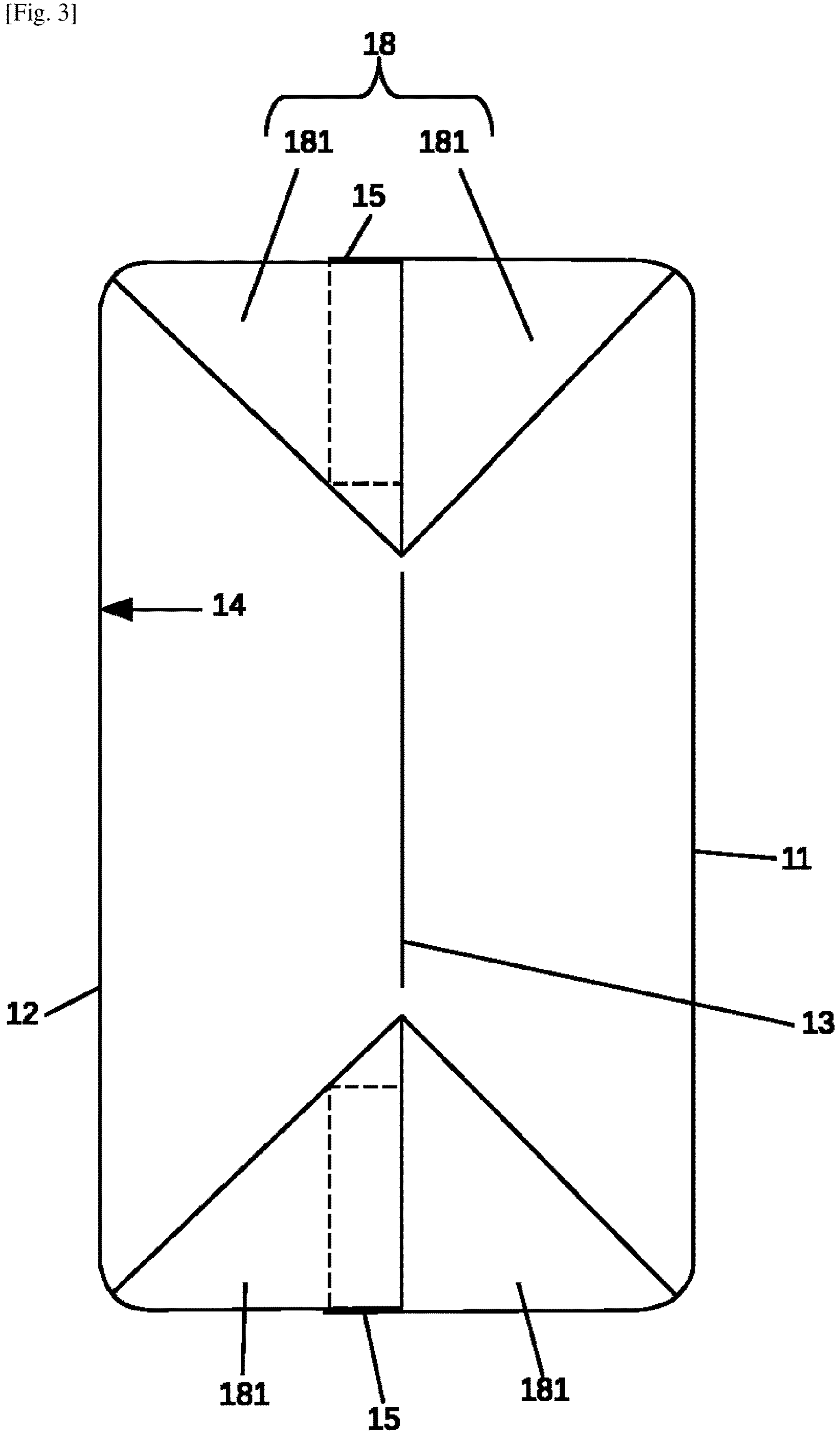

[Fig. 4]
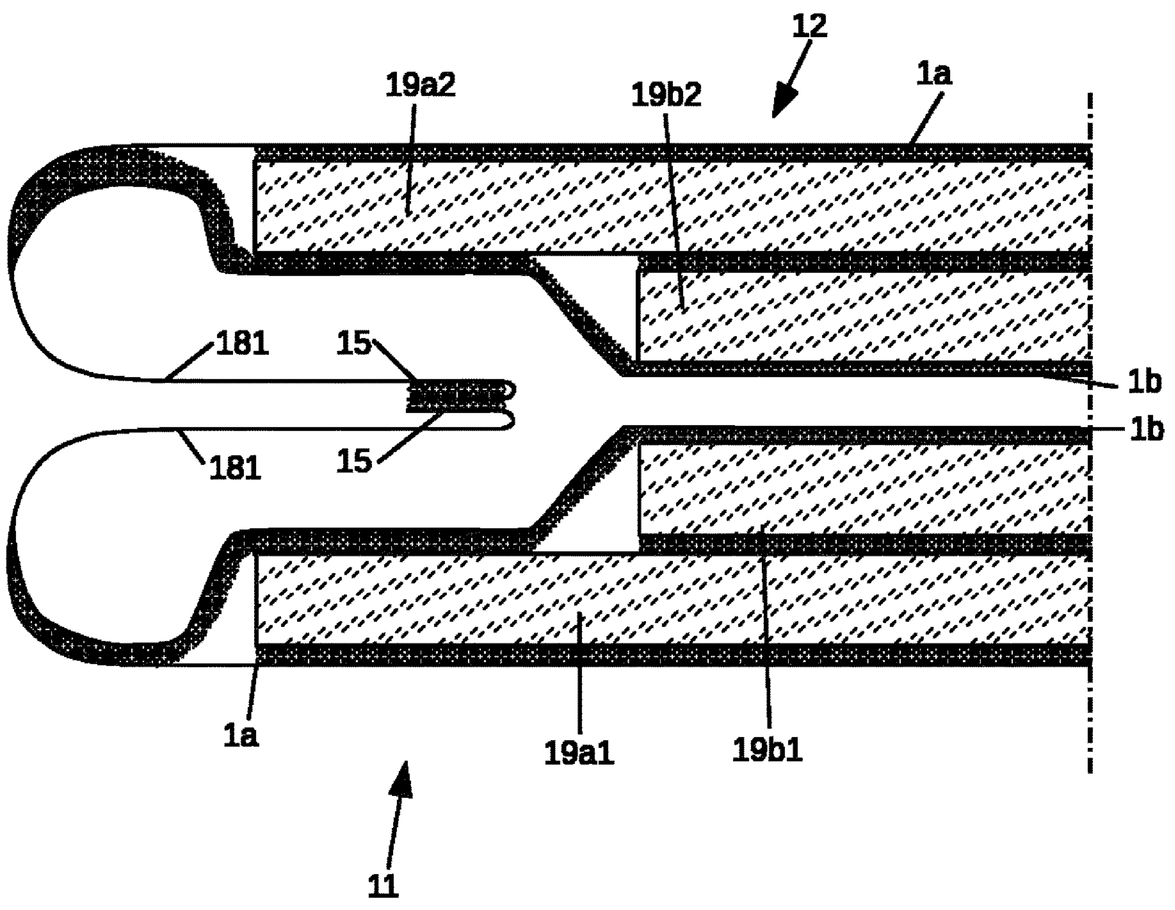

[Fig. 5]
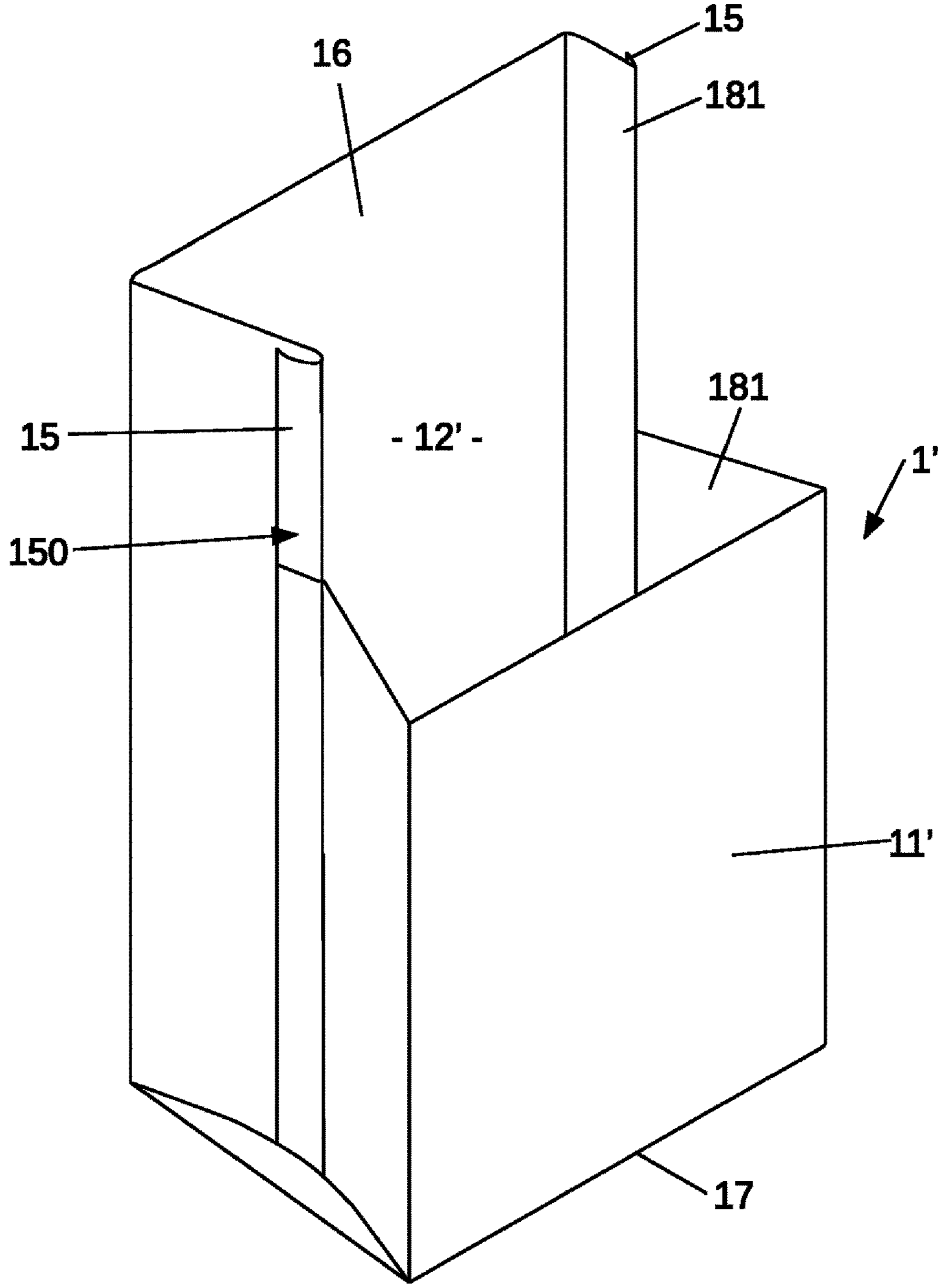
[Fig. 6]
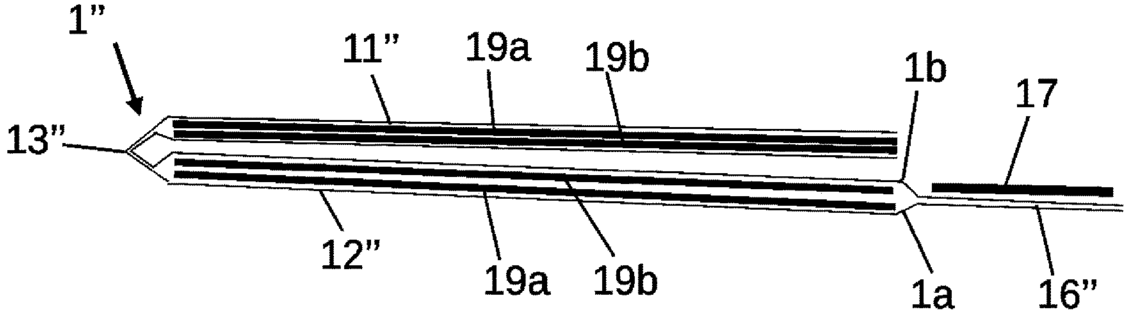

[Fig. 7]
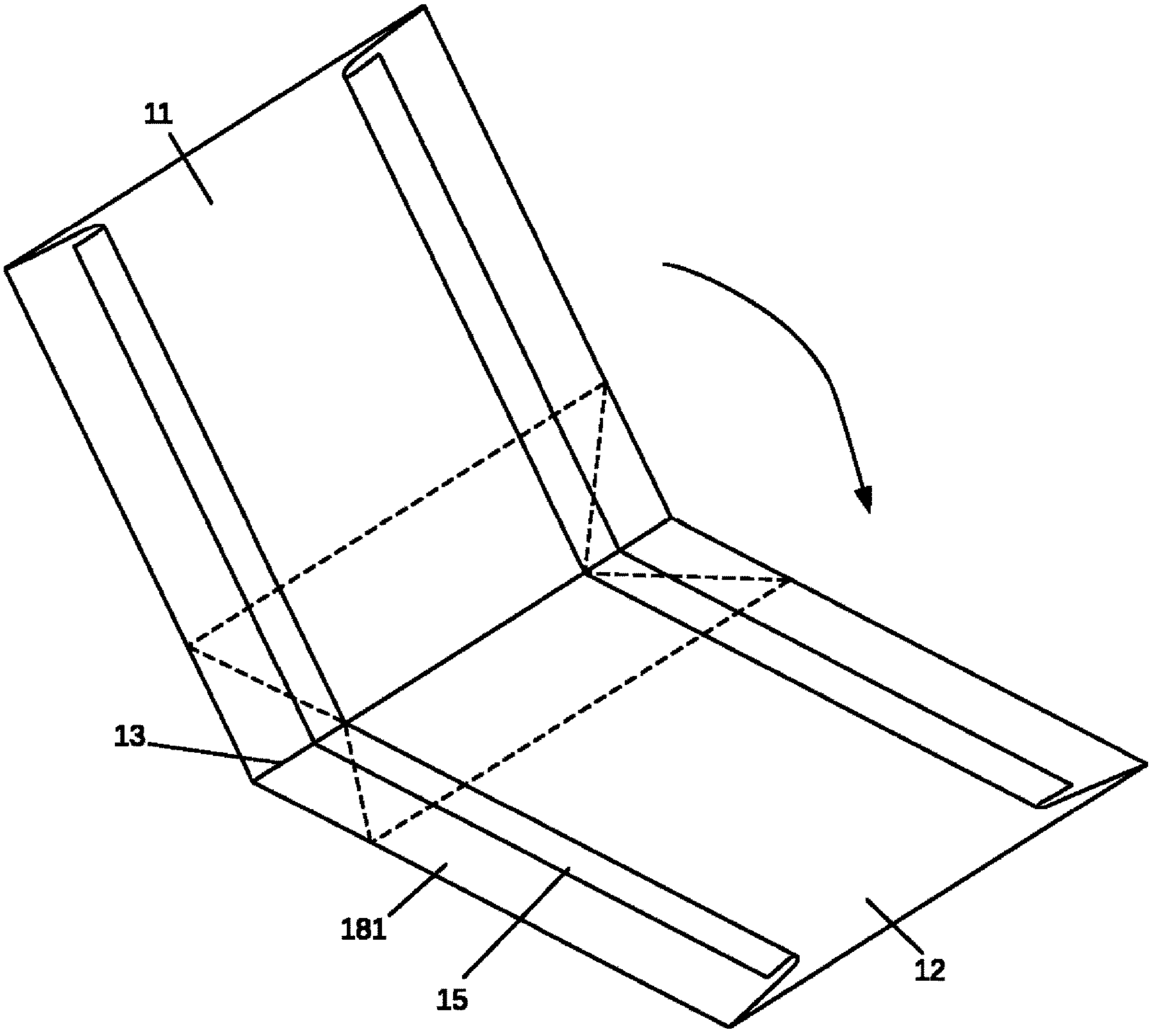

FLEXIBLE BAG HAVING A CONVERTIBLE BOTTOM, METHOD AND MACHINE FOR MANUFACTURING SAME

CROSS-REFERENCE TO RELATED APPLICATIONS

This is a National Stage application of PCT International Application PCT/EP2022/062438, filed on May 9, 2022, which claims the benefit of French Patent Application FR2105064, filed on May 12, 2021 and French Patent Application FR2105765, filed on Jun. 1, 2021, all of which are incorporated herein by reference in their entirety.

TECHNICAL FIELD

The invention concerns a flexible bag with bellows and a bottom that is transformable, in particular to obtain a square bottom. The invention also concerns a continuous process and a machine for making such flexible bags using a sheet of flexible material, in particular paper.

PRIOR ART

Industrial processes for manufacturing bags made of flexible materials such as paper or synthetic material have been known for a long time. For example, document FR 1 270 400 describes a process for manufacturing such bags. A continuous sheet of paper is unreeled then cuts are made on the edges in such a way as to free up bonding seams that are symmetrical with respect to a longitudinal middle of the sheet extending along an area of the sheet we call the first flap. The seams are folded longitudinally on the sheet and coated with adhesive on the upper face, opposite the first flap. The sheet is cut into sections, for example by a clean cut and folded along a transversal crease to delimit a second flap which is folded over the first flap. The second flap is thus bonded to the seams and the container is delimited between the first flap and the second flap. When you want the bag to form an envelope, the cut is made in such a way that a tab remains prolonging the first flap opposite the transversal crease. It is thus possible to manufacture bags at a high rate with a large variety of materials and formats.

Document WO 2016 097310 A1 shows an example of bags comprising bellows. This document also shows a machine that is used to form an envelope from the tube using two stations each of which comprises a pair of contra-rotary cylinders whose work makes it possible to make a separation into sections and tear off a waste piece to reveal a tab at the front of the section on the same wall as the rear tab. Thus, after being folded, the tabs are applied to the same wall.

When manufacturing the bags, the removal of the waste piece is a limitation: on the one hand, it can be seen this is a limiting factor for the speed of bag manufacturing, and on the other hand the large amount of waste pieces is always a constraint that must be managed. Furthermore, the adjustment of such a machine requires a high level of technical expertise. A great deal of time is required to make the adjustment when changing the format of the bags, particularly in the case of a change of width, because the means of perforation will have to be changed and adjusted.

The fact of making a clean cut instead of tearing gives a bag with a quality that is perceived as being better, the edge being sharper. However, this process also generates waste when making the lateral seams.

Document EP-3564146-A1 shows a bag manufacturing process that is quite similar to that in FR 1 270 400, but differs in that no cut is made in the edge. The flaps folded one on the other are bonded together along the edges. The process therefore does not generate any waste, but the useful width of the bag is reduced by the width of the areas bonded to each other. Furthermore, this type of bonding is more fragile because the constraints for separating one flap from the other are concentrated on the edge of the adhesive area.

We also know of bags with a square bottom where the advantage is that they can more easily be stood on their bottom and stay open. Documents U.S. Pat. No. 687,679A, FR 1 120 408, WO2020/049376 A1, FR 2 054 249 A5 and EP 2 864 114 B1 describe examples of bags and of machines for making such bags.

The manufacturing operations for such a bag are much more complex than those for a flat bag in such a way that the production rates are much more limited.

In order to produce bags which have the possibility of being used as square-bottomed bags, document WO 2020/120616 A1 shows a technique for transforming a flat bag into a square-bottomed bag. This method, enabling production at a high rate, is not suited to all types of bag however, in particular when the material is a low-grammage paper.

DESCRIPTION OF THE INVENTION

One of the objectives of the invention is to produce bags with bellows that can be used as square-bottomed bags and that can be produced at a high rate.

With these objectives in mind, the object of the invention is a bag made of a flexible material comprising a first and a second flap comprising cheeks along their edges, the cheeks being linked to form two bellows linking the flaps, one end of the bag perpendicular to the edges being closed, the bag being characterised by the fact it comprises a system with at least one reinforcement panel extending over a central part of the flaps, between the bellows.

By adding at least one reinforcement panel to the bag with bellows, it is possible to provide walls with different degrees of stiffness, which makes it possible to give it a better resistance when the bag is deployed, before and after filling. As the panel is delimited outside the bellows, the separation of the flaps tends to keep a parallelism between the flaps while obtaining the deployments of the bellows, owing to the stiffness reinforced by the panel system on the flaps. Different configurations are possible, as shown by the rest of the discussion. For example, the flexible material could be paper with grammages varying, for example, between 40 and 150 g/m$^2$, synthetic material, textile or a combination of these materials. The reinforcement panels have, for example, a grammage greater than 100 g/m$^2$, for example greater than 250 g/m$^2$, or even greater than 300 g/m$^2$. The panels also make it possible to provide additional functionalities, such as a protection against impacts or a thermal insulation. The visual appearance of the exterior of the bag remains more or less the same as that without panels, the reinforcement panels being hidden inside the bag. Each reinforcement panel can be formed by superposing multiple layers. The materials can be varied such as embossed paper to provide a layer of mechanical and thermal protection, a sheet of synthetic foam or including bubbles, or a reflective sheet.

As per an improvement, each flap comprises a crease marking line, one opposite the other to delimit a bottom at the closed end. The marking line facilitates folding of the flap at this level, which makes it possible to delimit a rectangular-shaped bottom linking the rest of the flaps together to each other.

As per a first accomplishment mode, the system with at least one panel comprises a first and a second panel extending respectively over the first and second flap, the panels being separated at the level of the closed end. The reinforcement provided by the panel system is interrupted at the level of the closed end, which makes it possible to store the bag while being folded at this level. This crease does not provide much resistance when opening the bag since it is not reinforced by the panels.

As per an improvement to the first accomplishment mode, the first and second panels extend only beyond the marking lines with respect to the bottom. Thus, only the walls beyond the bottom are reinforced, which allows the bottom to conform to the position conferred by the walls.

As per a second accomplishment mode, the system with at least one panel comprises a third panel extending over the first and second flaps. This panel, which replaces the first and second panels of the previous accomplishment mode, makes it possible to stiffen the bottom, in such a way that the walls follow its shape when the bag is deployed and when it is filled.

As per an improvement to the first or second accomplishment mode, the system with at least one panel only extends short of the marking lines on the bottom side. The system with at least one panel allows the walls to fold easily at the level of the marking lines, while conferring a shape with one or two pieces on the bottom.

As per an alternative improvement, the panel system extends on both sides of the marking lines, the marking lines also being formed on the system with at least one panel. The system with at least one panel therefore also extends along the beginning of the walls, which makes it possible to stiffen both the bottom and the beginning of the walls, or even the whole height of the walls.

As per an improvement, each bellows cheek is stuck against the adjacent flap according to a corner area extending to the corner of the central part of the flap between the closed end and the marking line on said flap. In this corner area and when deploying the bag, the bellows cheek remains naturally in contact with the central part of the flap. By bonding these parts in this area, the deployment is facilitated in the shape of the bottom by giving it a greater stiffness, owing to the bonding of two thicknesses together.

As per a constructive disposition, the corner area takes the form of a right triangle whose right-angle corner is in a corner of the central part of the flap. The formation of a crease is facilitated along the hypotenuse of the triangle, which corresponds to the configuration of a "square" bottom in the presence of bellows.

As per an improvement, a second strip of flexible material is bonded inside the bag and covers at least the system with at least one reinforcement panel. This layer makes it possible to confer specific surface properties on the interior of the bag and, in particular, to enclose the system with at least one panel. For example, this additional layer provides the interior of the bag with a smooth surface in the case where an embossed reinforcement is used, or with a rough or adhesive surface, or with a watertight surface.

The object of the invention is also a process for manufacturing a bag with a flexible material, whereby:

- a first strip of flexible material is unreeled as a continuous sheet using a first unwinding means in a longitudinal direction,
- a fold is made on the first strip along a transversal folding crease using folding means to fold a first flap onto a second flap against an internal face of the first strip,
- the first and second flaps are brought together along the edges,
- using a first cutting means the strip is cut transversely to form a section before or after the folding of the flaps one onto the other, the section forming the bag at the end of the operations, characterised by the fact that, using a cheek formation station, a cheek and a hem are formed on each edge of the first layer before folding and adhesive is applied to the hems at least over one length of the first or second flap on one seam face, using application means,

- the folding bringing the hem against hem for each edge by the seam face in such a way as to obtain bonding of the hems to each other to bring the first and second flaps together along the edges by means of the bellows formed by the cheeks,
- at least one reinforcement layer is unreeled using feed means,
- the reinforcement layer is cut to obtain a system with at least one reinforcement panel, using a second cutting means,
- a first application of adhesive is made, using the first adhesive application means, at least on one of the elements among the first strip and the system with at least one reinforcement panel,
- before folding, the first strip and the system with at least one reinforcement panel are brought together on the internal face of the first strip to stick them together by means of a first application of adhesive, in such a way that the system with at least one panel is situated between the first and second flaps.
- using a push-back means, a crease marking line is made on each flap on both sides of the folding crease in such a way that after folding, each marking line is opposite the other one.

This process makes it possible to produce bags as described previously without producing waste, so without limitation on the production rate caused by having to manage the removal of such waste. The process uses the principle described in document FR 1 270 400 but without having to cut the edges. Indeed, the edges are folded over their whole length to form the cheeks of the bellows and hems and the latter are folded one onto the other after application of adhesive to assemble the two folded flaps one on the other. Cutting can be achieved by a clean-cutting means, that is to say by shearing, which gives a good perceived cutting quality. Cutting could also be achieved with a toothed knife cooperating with a groove to obtain the separation without any prior perforation lines. Cutting could also be obtained by tearing, that is to say by traction on a portion that has perforations initiating a cutting line. The cutting system is the same whatever the width of the bag to be made. It is therefore easy to change the width.

As per an improvement, a second strip of flexible material is unreeled using a second unwinding means, a second application of adhesive is made using a second adhesive application means, and the second strip and the first strip are brought together on the internal face of the first strip so the second strip at least covers the system with at least one reinforcement panel and is bonded to it. The two layers are assembled before folding, which makes it possible to have this second layer inside the bag. Preferably, it extends over the same length as the first layer.

As per a constructive disposition, the widths of the first and second strips are different in such a way that the hems extend from just one of said strips. This makes it possible to have a layer that serves as mechanical reinforcement for the other layer without, however, hindering folding the hems when forming them.

As per an alternative characteristic, the width of the second strip is identical to that of the first strip. In this case, the hems are formed with two layers, which reinforces them mechanically.

As per an improvement, the system with at least one reinforcement panel comprises a single panel that extends over the first and second flaps.

As per an accomplishment mode, two reinforcement panels are successively cut and placed, one on the first flap and the other on the second flap leaving a gap between them at the level of the folding crease. We thus obtain a bag with two reinforcement panels separated at the level of the folding crease.

As per an improvement, using a third means of adhesive application downstream of the intake means and upstream of the cheek formation station, adhesive is applied to each bellows cheek or to the central part of the flaps in the corner areas that extend, after formation of the bag, to the corners of the central part of the flaps between the folding crease and the marking lines on said flaps. After the formation of the cheeks, they are folded onto the central part of the flaps, which makes it possible to obtain the bonding of the corner areas.

As per an improvement, the hem is also bonded to the face opposite the seam face along just one of the elements among the first and second flaps. Thus, considering one of the edges of the manufactured bag, the two hems are superposed and bonded to each other and, in addition, just one of them is bonded to the cheek where applicable, or to the internal face of the flap. It can be seen that this arrangement makes it possible to stress the adhesion essentially sliding one hem over the other, whereas without bonding, the constraint is concentrated on the edge of the bonded area and tears the bond more easily.

The object of the invention is also a machine for manufacturing a bag made of flexible material:

- a first unwinding means for unreeling a first strip of flexible material as a continuous sheet in a longitudinal direction,
- a folding means for folding the first strip along a transversal folding crease and folding a first flap onto a second flap against an internal face of the first strip,
- an assembly means for bringing the first and second flaps together along the edges,
- a first cutting means for cutting the strip with a transversal cut to form a section before or after the folding of the flaps one onto the other, the section forming the bag at the end of the operations;
- characterised by the fact the machine also comprises a cheek formation station for forming a cheek and a hem on each edge of the first layer before folding
- an application means for applying adhesive to the hems over at least one length of the first or of the second flap on one seam face,
- the folding means being configured to bring each edge hem against hem by the seam face so as to obtain bonding of the hems to each other and bring the first and second flaps together along the edges by means of bellows formed by the cheeks,
- a feed means for unreeling at least one reinforcement layer,
- a second cutting means for cutting the reinforcement layer to obtain a system with at least one reinforcement panel,
- a first adhesive application means for the first application of adhesive on at least one of the elements among the first strip and the system with at least one reinforcement panel,
- an intake means, upstream of the folding means and downstream of the first adhesive application means and of the feed means, configured to bring the first strip and the system with at least one reinforcement panel together on the internal face of the first strip to stick them together thanks to the adhesive application, in such a way that the system with at least one panel is situated between the first and second flaps.
- a push-back means for making a crease marking line on each flap on both sides of the folding crease in such a way that after folding, each marking line is opposite the other one.

As per an improvement, the machine also comprises a third means of adhesive application downstream of the intake means and upstream of the cheek formation station, to apply adhesive to each bellows cheek or to the central part of the flaps in the corner areas that extend, after formation of the bag, to the corners of the central part of the flaps between the folding crease and the marking lines on said flaps.

BRIEF DESCRIPTION OF THE FIGURES

The invention will be better understood and other features and advantages will appear on reading the following description, the description referring to the attached drawings among which:

FIG. 1 is a perspective view of a bag as per a first invention accomplishment mode, in the folded position at machine output;

FIG. 2 is a perspective view of the bag in [FIG. 1] after deployment and before filling;

FIG. 3 is an end view seen from the open end of the bag in [FIG. 2];

FIG. 4 is a sectional view as per plane IV of [FIG. 1];

FIG. 5 is a view similar to [FIG. 2] of a bag as per a variant;

FIG. 6 is a longitudinal sectional view of the bag in [FIG. 4], in the folded position;

FIG. 7 is a view of the bag in [FIG. 4] in an intermediate manufacturing step;

DETAILED DESCRIPTION

Figure 8:
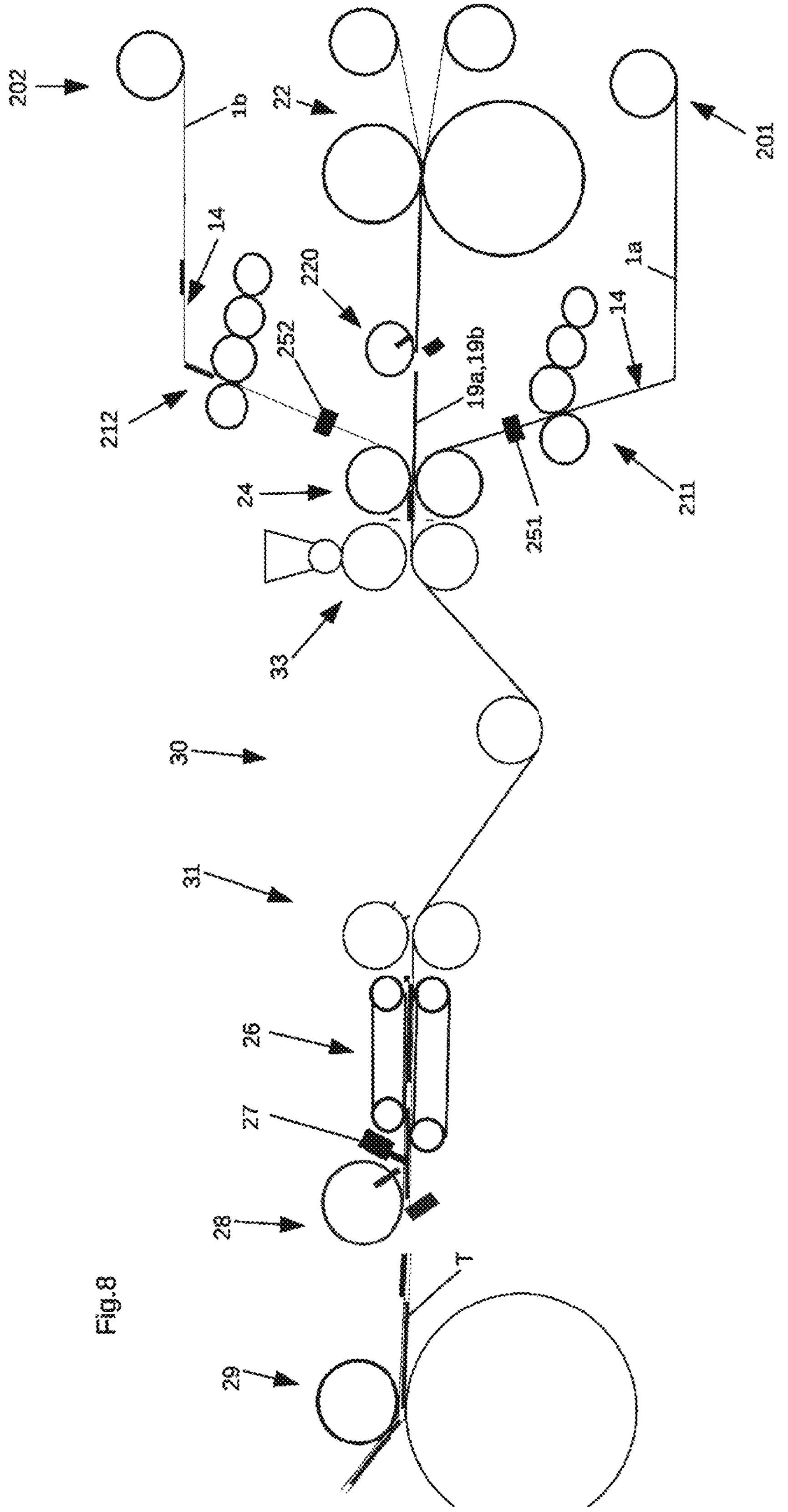
FIG. 8 is a schematic view of a machine for manufacturing bags as per [FIG. 1]

A bag 1 envelope as per the invention's first accomplishment mode is shown in FIGS. 1 to 4. The bag 1 made with a flexible material comprises a first and a second flap 11, 12 extending from the same sheet folded along a transversal folding crease 13 towards an internal face 14. The flaps 11, 12 are brought together along their edges 1100 which are perpendicular to the folding crease 13. A hem 15 is linked to a central part 110 of the flap 11, 12 by means of a cheek 181 folded onto the central part 110. Furthermore, the hem 15 is bonded to cheek 181 of the second flap 12. Furthermore, the hem 15 of the first flap 11 is bonded to the hem 15 of the second flap 12 on seam faces 150, in such a way that a bellows 18 is formed by two cheeks 181 linked by the hems 15 stuck together. Each flap 11, 12 comprises a marking line 17 at a distance from the folding crease 13 more or less equal to the width of the cheeks 181, excluding the hem.

The bag 1, shown in the deployed position in [FIG. 2], can be stood on a bottom delimited between the marking lines 17.

As shown in the transverse sectional view of [FIG. 4], flaps 11, 12 are formed by superposing a first strip 1*a*, of a system of reinforcement panels 19, comprising a first reinforcement panel 19*a* and a second reinforcement panel 19*b*, and a second strip 1*b*. The first and second panels 19*a*, 19*b* are divided into two parts 19*a*1, 19*a*2, 19*b*1, 19*b*2 on each side of the folding crease 13. The first reinforcement panel 19*a* is narrower than the central part 110 of the first strip 1*a* and the second reinforcement panel 19*b* is narrower than the first reinforcement panel 19*a*. The second strip 1*b* is narrower than the first strip 1*a* but wider than the first reinforcement panel 19*a*. In [FIG. 4], it can be seen that the first strip 1*a* comprises adhesive on the internal face in such a way that the first reinforcement panel 19*a* is stuck to it. Likewise, the second strip 1*b* comprises adhesive on the internal face in such a way that it is stuck to the second reinforcement panel 19*b*, to the first reinforcement panel 19*a* on the edges not covered by the second reinforcement panel 19*b*, and on the first strip 1*a* between the hem 15 and the edge of the first reinforcement panel 19*a*.

In a variant shown in FIGS. 5 to 7, the first flap 11' of the bag 1' is shorter than the second flap 12' in such a way that a tab 16 remains while being the part of the second flap 12' not covered by the first flap 11'. In the longitudinal sectional view of [FIG. 4], the reinforcement panels 19*a*, 19*b* are interrupted at the level of the folding crease 13 and are therefore divided into two parts 19*a*1, 19*a*2, respectively 19*b*1, 19*b*2. Furthermore, the reinforcement panels 19*a*, 19*b* do not extend onto tab 16 which is thus formed by the superposing of the two strips 1*a*, 1*b* only.

FIG. 7 shows the bag 1' of [FIG. 5] in a manufacturing step before the folding of the first flap 11' onto the second flap 12'. The folding crease 13 serves as the pivoting axis of the first flap 11 onto the second flap 12.

A machine 2 as per a first accomplishment mode of the invention enabling the manufacture of bags is shown schematically in [FIG. 8]. The machine 2 comprises:

- a first unwinding means 201 for unreeling the continuous strip of flexible material in a longitudinal direction;
- a first means of adhesive application 211 for making a first application of adhesive at least on the first strip 1*a,*
- a feed means 22 for supplying the reinforcement layer,
- a second cutting means 220 for cutting the reinforcement layer and thus obtain a reinforcement panel 19*a*, 19*b,*
- a second unwinding means 202 for unreeling the second strip 1*b* of flexible material,
- a second means of adhesive application 212 to make a second adhesive application on the second strip 1*b,*
- an intake means 24 also configured to assemble the second strip 1*b* and the first strip 1*a* with the reinforcement panels 19*a*, 19*b* between them on the internal face 14 of the first strip 1*a,*
- a hemmer 251 for each edge to form a hem 15 on each edge of the first strip 1*a* upstream of the intake means 24,
- a cheek formation station 30 downstream of the intake means 24 and also configured to form a cheek 181 on each edge of one of the strips 1*a*, 1*b* or of the superposing of the strips 1*a*, 1*b,*
- a push-back means 31 downstream of the cheek formation station 30 to mark a crease marking line 17 on each flap on both sides of the folding crease 13,
- a transport means 26 for guiding the assembly of the layers downstream of the push-back means 31;
- an application means 27 for applying adhesive to the hems 15 over at least one length of the first or second flap 11, 12 on a seam face 150,
- a first cutting means 28 for cutting the strip with a transversal cut to form a section T forming the bag 1 at the end of the operations;
- a folding means 29 for forming a fold of the first strip 1*a* along a transversal folding crease 13, to fold the first flap 11 onto the second flap 12 against an internal face 14 of the first strip 1*a*, in order to bring the hem 15 against hem 15 for each edge by the seam face 150 in such a way as to obtain the bonding of the hems 15 to each other to bring the first and second flaps 11, 12 together along the edges,
- a stacking means, not shown, to stack the bags downstream of the folding means 29.

Optionally, the machine 2 may comprise a third means of adhesive application 33, downstream of the intake means 24 and upstream of the cheek formation station 31, to apply adhesive to each bellows cheek 181 or to the central part 110 of the flaps in the corner areas 10 that extend, after bag formation, to the corners of the central part 110 of the flaps between the folding crease 13 and the marking lines 17 on said flaps 11, 12

Optionally, the machine comprises another hemmer 252 for making a hem 15 on the edges of the second strip 1*b* in the case where the second strip 1*b* is wider than the first strip 1*a* and where the hems 15 are only supported by the second strip 1*b*.

The first, second and third adhesive application means 211, 212, 33 are, for example, flexographic rollers making it possible to apply adhesive according to a predetermined pattern. For the first and second application means, the adhesive is applied on the internal face 14 of the strip, that is to say on the face opposite the other strip after assembly. The third application means 33 is placed downstream of the intake means, because the exposed adhesive would make the adhesive-coated surface stick to the rollers of the intake means 33. However, it could be considered that the third adhesive application means 33 could be placed upstream of the intake means 33 if the latter comprises circular grooves allowing the adhesive-coated areas 10 to pass.

The intake means 24 is made with a pair of contra-rotary rollers 241 driven by a motor, not shown. They apply a pressure to the strips 1*a*, 1*b* to obtain bonding between them and to the reinforcement panels 19*a*, 19*b*.

The feed means 22 also comprises intake means 221 for bringing together two reinforcement strips, then the second cutting means 220 for cutting the reinforcement strips assembled into panels 19*a*, 19*b*, as detailed below.

The transport means 26 should preferably be means functioning by suction so as not apply any forces through the thickness of the assembly.

The application means 27 shall, for example, be nozzles injecting adhesive intermittently.

The first cutting means 28 and the folding means 29 are conventional and are not described here. The machine's various parts are driven in rotation either by the same motor and synchronous mechanical transmissions such as cog belts or gears, or by several individual electronically synchronised motors, or a combination of the two solutions.

Figure 9:
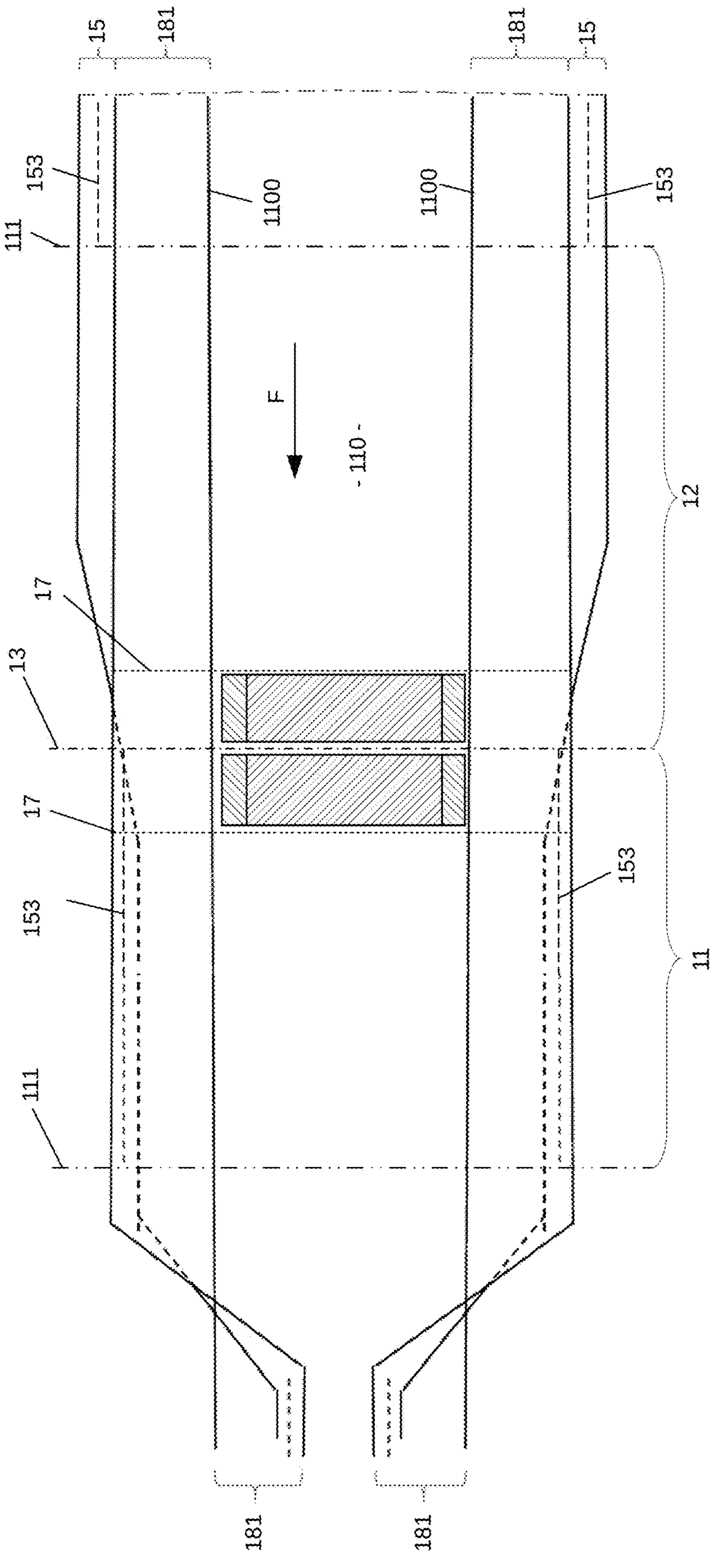
FIG. 9 is a plan view of an intermediate bag manufacturing phase including, in particular, the cheek formation phase.

FIG. 9 shows the first strip 1*a* of flexible material seen from the top, therefore presenting its internal face 14, from its unreeling on the right to the formation of the bag 1 on the left, as shown by arrow F. The second strip 1*b* is not shown to avoid overloading the illustration. The width of the strip 1*a* is subdivided into a central part 110, two cheeks 181 and two hem areas 15 on each side of the central part 110. By passing through the first adhesive application means 211, adhesive is deposited at intervals on the edge of the hem area 15 over the length represented by the dashed line 153 corresponding to the first flap 11, on the external face, opposite the internal face 14. The hem 15 is formed when passing through the hemmer 251 by folding onto the external face and is bonded onto the length extending from the future cutting 111 of the section to the future folding crease 13, along what will be the first flap 11.

The intake means 221 of the feed means 22 takes two layers of reinforcement and superposes them, the layer on the first strip 1*a* side being wider than the other one. The second cutting means 220 cuts a first part of the reinforcement panel 19*a*1, 19*b*1 which will extend over the first flap 11, then a second part of the reinforcement panel 19*a*2, 19*b*2 which will extend over the second flap 12. A small gap is created between the first and second parts of the system of reinforcement panels 19 in order to allow the easy creation of the folding crease 13. The intake means 221 of the feed means 22 slows down the reinforcement strip feed to allow the creation of a gap on the second flap 12 between the second part of the panel and the first part of the next section. The reinforcement panels 19 only extend over the central part 110 of the first strip 1*a*, and therefore not over the cheeks 181. In the first accomplishment mode, which is presented here, each part of the reinforcement panel 19 extends between the future folding crease 13 and a future marking line 17. All of the first strip 1*a* is covered by the second strip 1*b* over the panel system 19 to form an assembly of strips after passing through the intake means 24. The application of adhesive to the second strip 1*b* allows it to be bonded to the narrowest reinforcement panel, in the areas of the reinforcement panel not covered by the previous one and to the first strip 1*a*.

Downstream of the intake means 24, the assembly of strips passes through the cheek formation station 30 in which the cheeks 181 are folded against the second strip 1*b*. The hem 15 becomes visible again from the top, when looking at the internal face 14 of the bag. After folding the cheek 181 against the internal face 14, the latter extends between the hem 15 and a central part 110 of the strip, in such a way that a stack is formed with, in the following order, the central part 110, the cheek 181 and the hem 15.

The visible face of the hems 15, also called seam face 150, is coated with adhesive over the same lengths on both sides of the future folding crease 13 by the application means 27, then the assembly of strips is cut by the first cutting means 28 into sections T, at the level of the cutting line 111. The sections T are transferred to the folding means 29 which forms the folding crease 13 and folds the first flap 11 onto the second flap 12. The hems 15 of the first flap 11 then adhere to the hems 15 of the second flap 12 and the bag 1 is formed, as shown in [FIG. 1].

Figure 10:
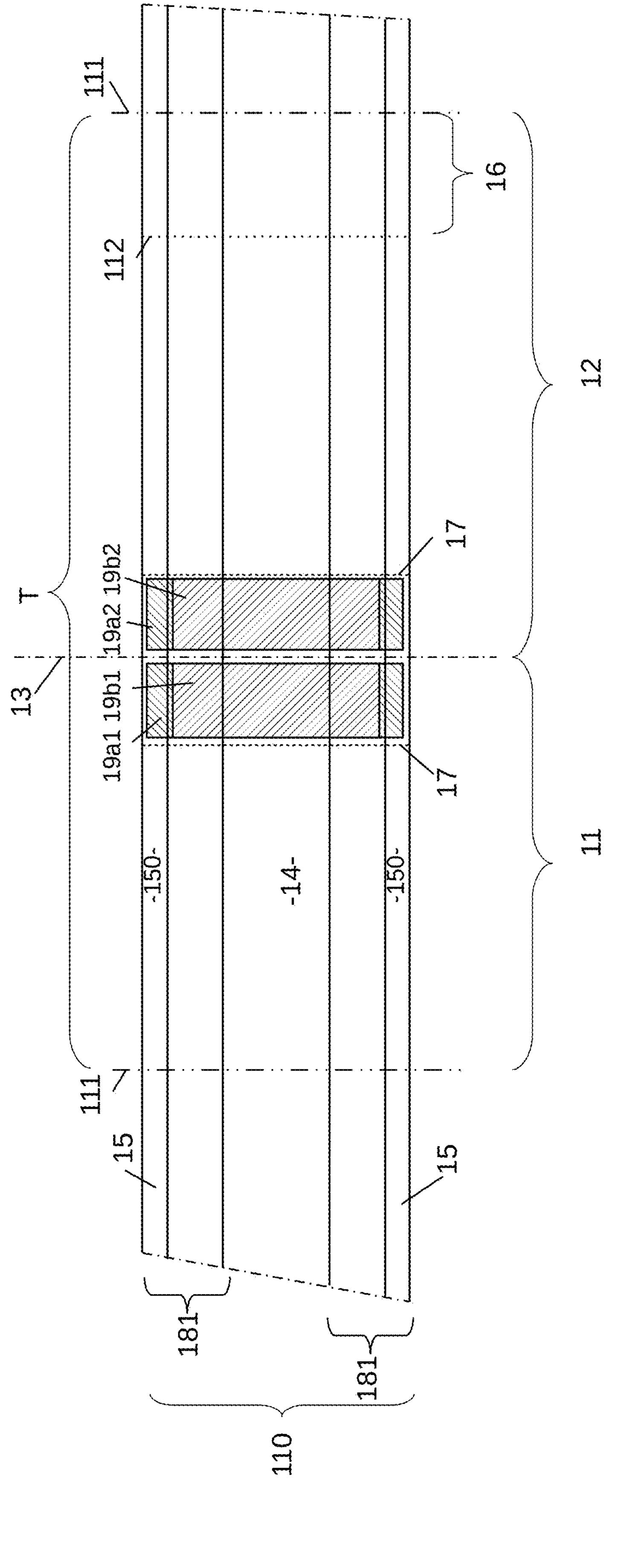
FIG. 10 is a plan view of an intermediate bag manufacturing phase, as per a first manufacturing mode.

FIG. 10 shows the assembly of strips after the formation of the cheeks 181. In particular, we have shown the two parts of the reinforcement panels 19*a*1, 19*b*1, 19*a*2, 19*b*2 on both sides of the future folding crease 13. The cut edge of the first flap 11 is located after folding at the level of the dotted line 112 and leaves a tab 16 on the second flap 12.

Figure 11:
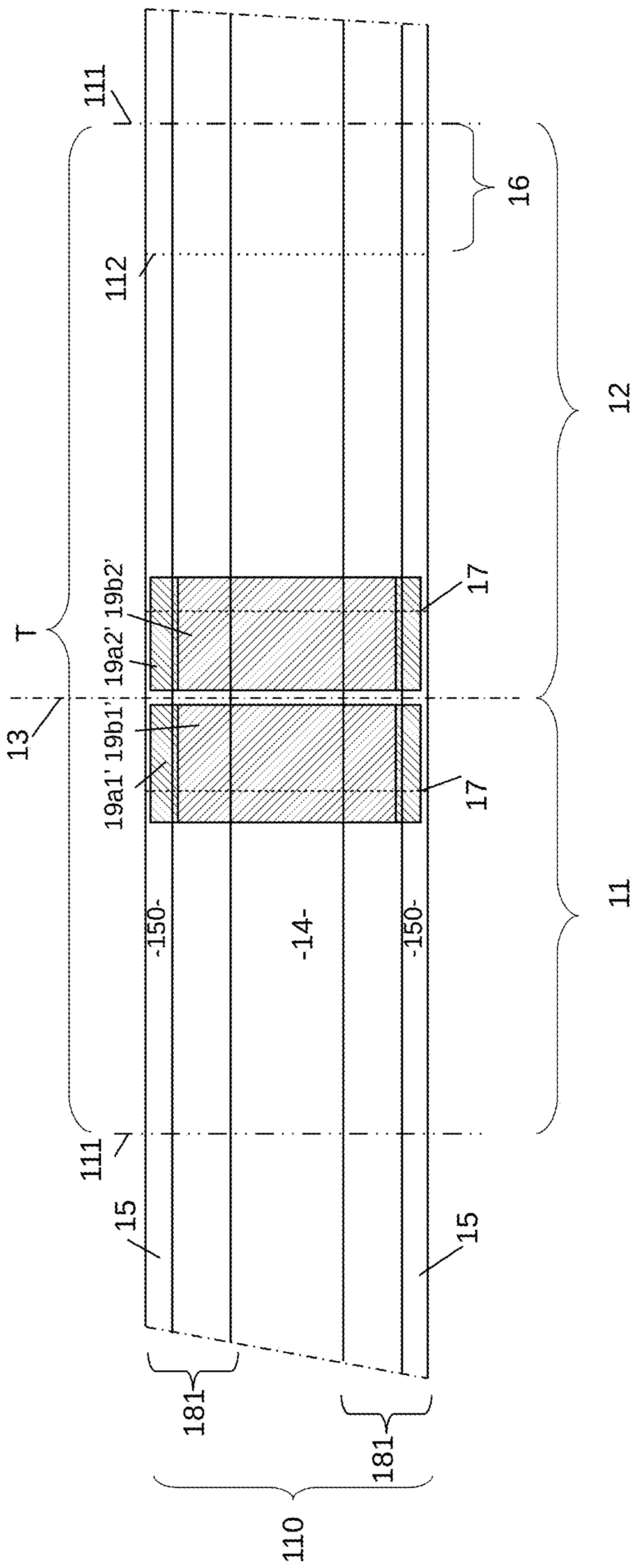
FIG. 11 is a plan view of an intermediate bag manufacturing phase, as per a second manufacturing mode.

FIG. 11 is a similar view to that of [FIG. 10] as per a second accomplishment mode. It differs from the first accomplishment mode in that the two parts of the panels 19*a*1', 19*b*1', 19*a*2', 19*b*2' are longer than in the first accomplishment mode and extend beyond the marking lines 17.

Figure 12:
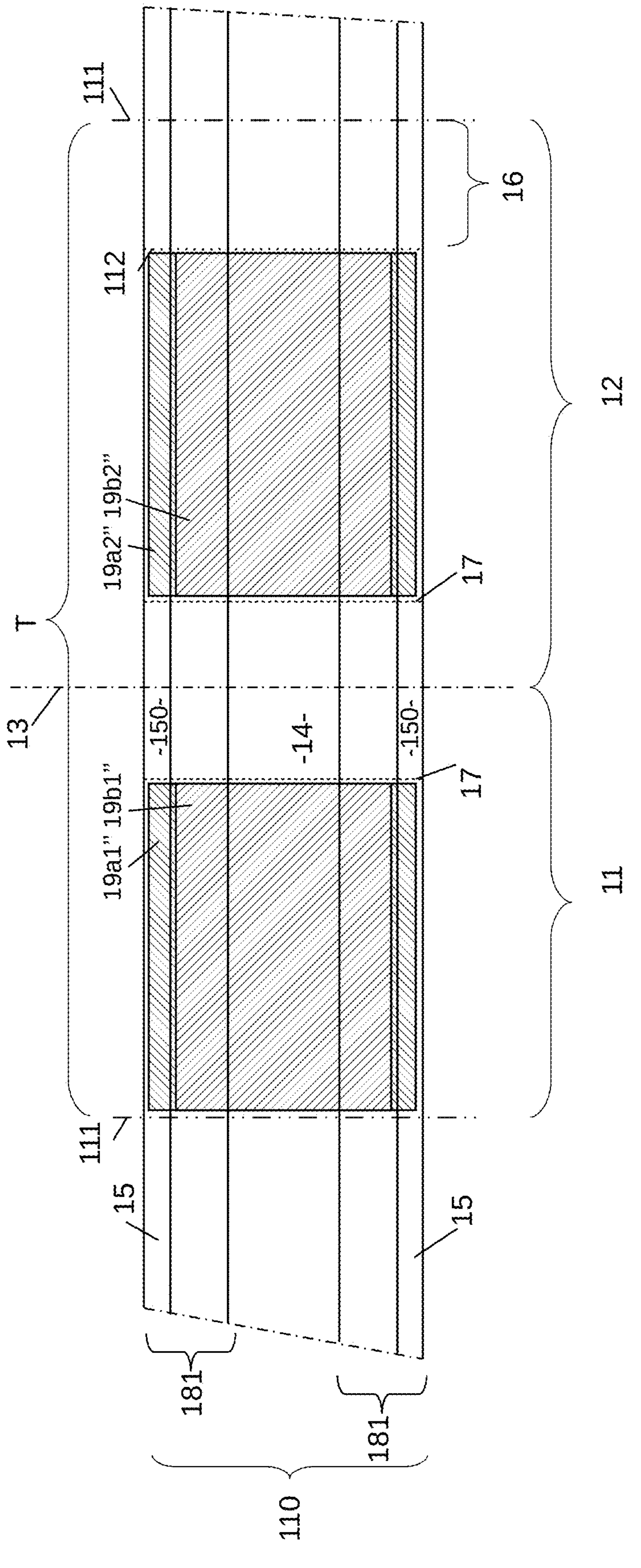
FIG. 12 is a plan view of an intermediate bag manufacturing phase, as per a third manufacturing mode.

FIG. 12 is a similar view to that of [FIG. 10] as per a third accomplishment mode. It differs from the first accomplishment mode in that the two parts of the panels 19*a*1", 19*b*1", 19*a*2", 19*b*2" extend between the marking lines 17 and the first edge of the first panel or to the mark 112.

Figure 13:
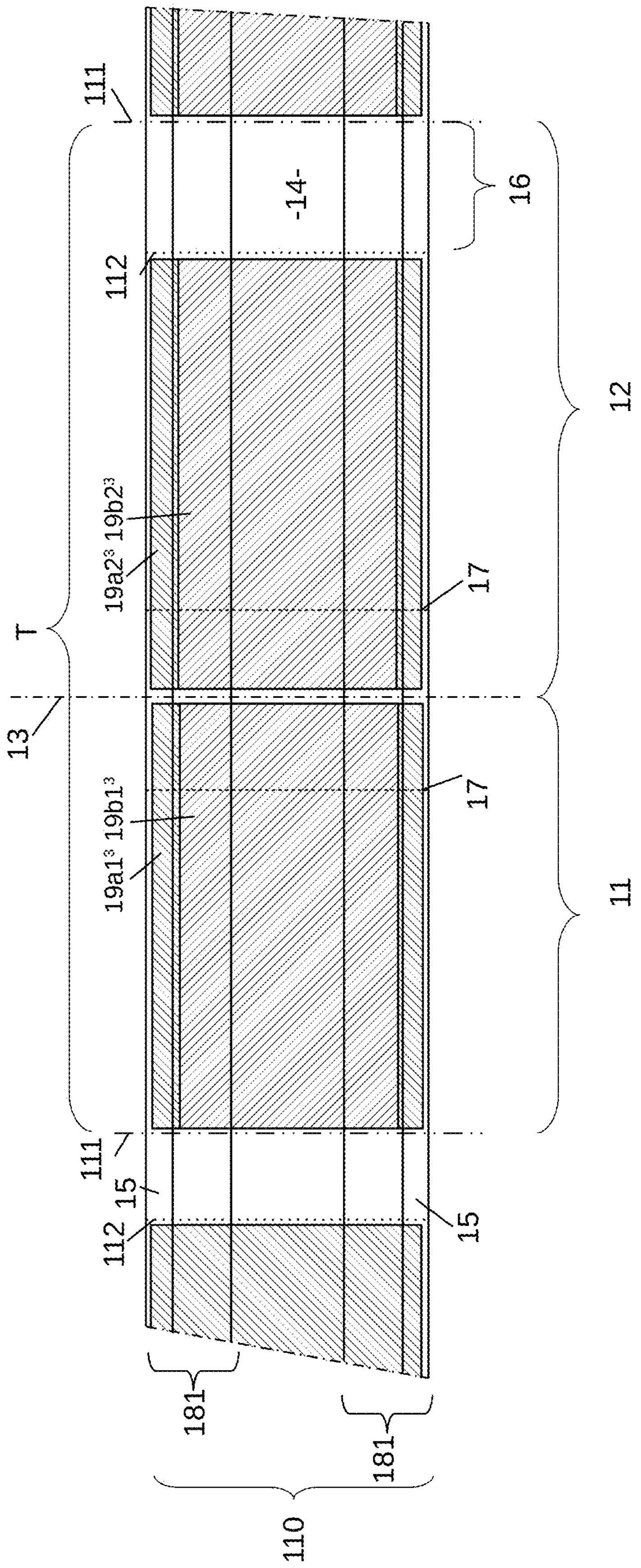
FIG. 13 is a plan view of an intermediate bag manufacturing phase, as per a fourth manufacturing mode.

FIG. 13 is a similar view to that of [FIG. 10] as per a fourth accomplishment mode. It differs from the first accomplishment mode in that the two parts of the panels $\mathbf{19}a\mathbf{1}^3$, $\mathbf{19}b\mathbf{1}^3$, $\mathbf{19}a\mathbf{2}^3$, $\mathbf{19}b\mathbf{2}^3$ extend beyond the marking lines 17 from the future folding crease 13 to the edge of the first flap 11 and to the mark 112.

Figure 14:
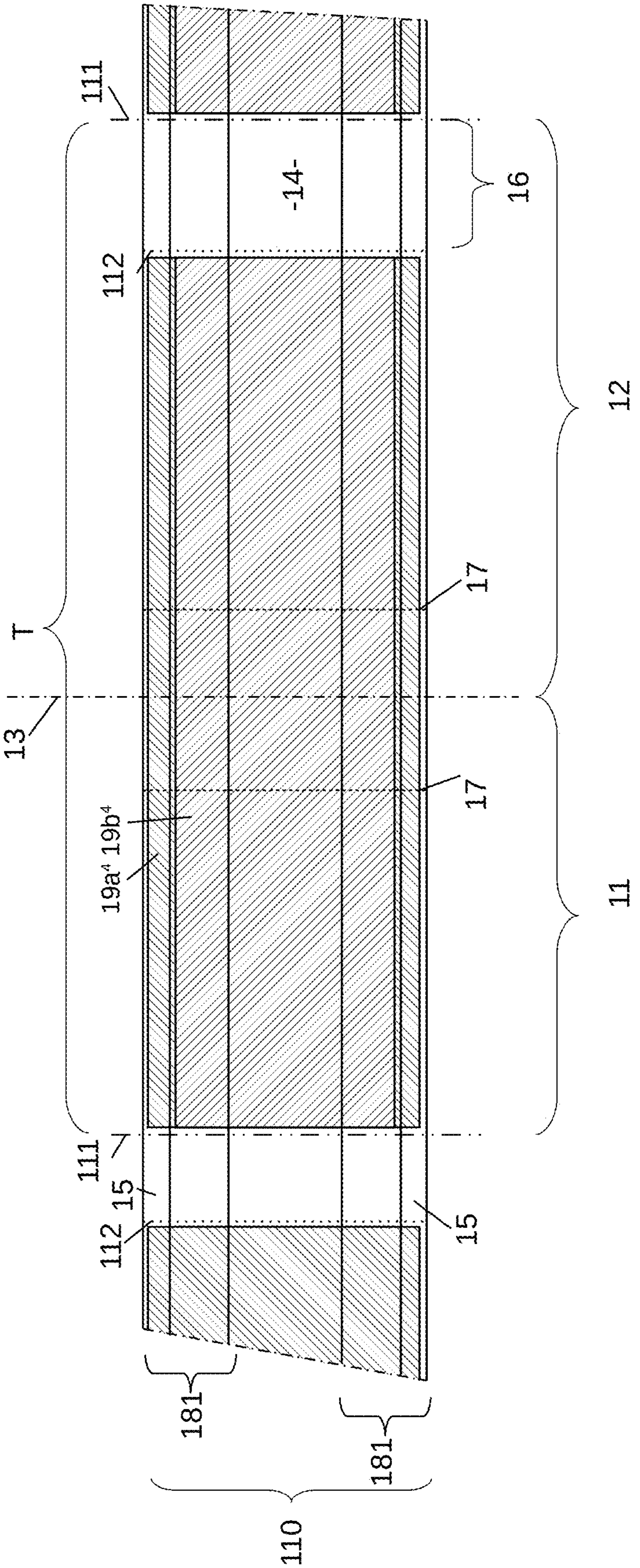
FIG. 14 is a plan view of an intermediate bag manufacturing phase, as per a fifth manufacturing mode.

FIG. 14 is a similar view to that of [FIG. 10] as per a fifth accomplishment mode. It differs from the first accomplishment mode in that the panels $\mathbf{19}a^4$, $\mathbf{19}b^4$ extend over the two flaps 11, 12 without any interruption at the level of the folding crease 13 and beyond the marking lines 17 from the edge of the first flap 11 and to the mark 112.

Figure 15:
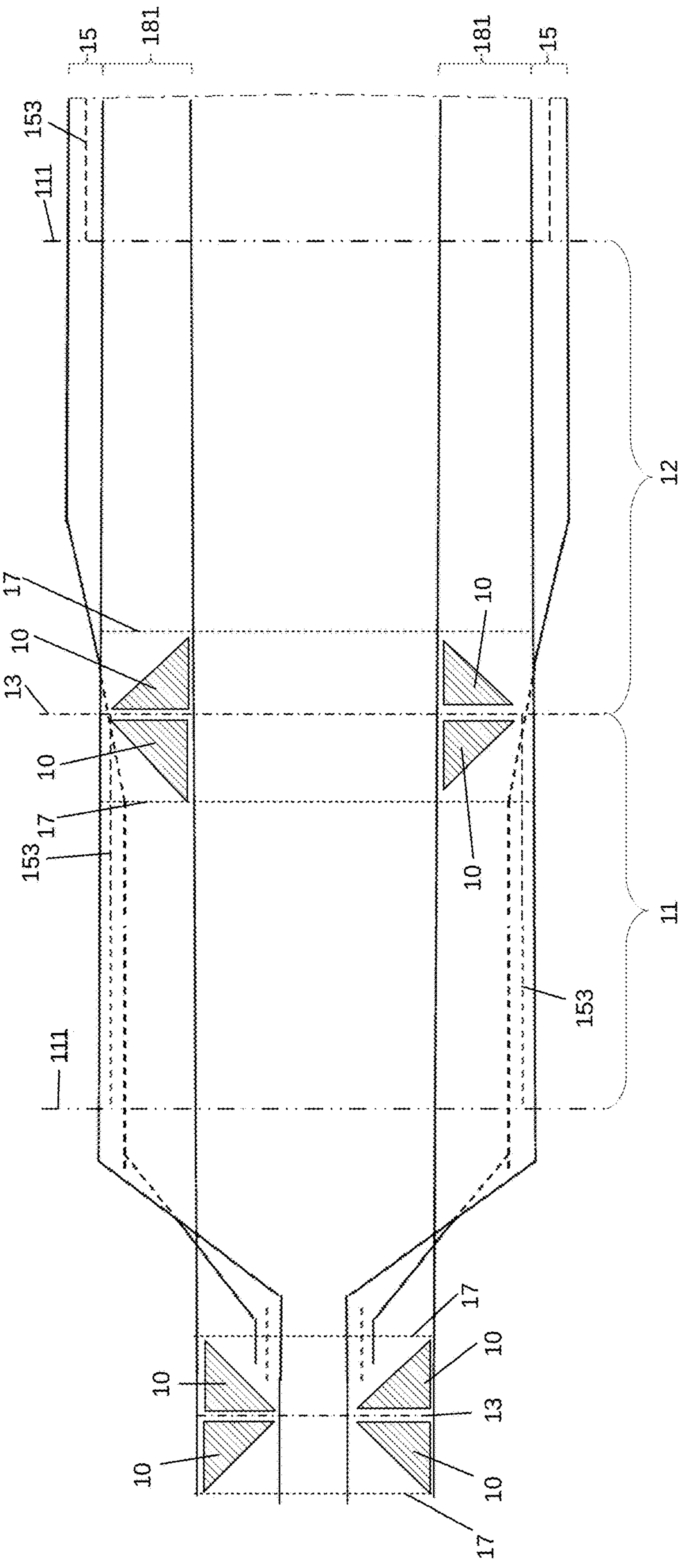
FIG. 15 is a plan view of a manufacturing step similar to [FIG. 9] showing an additional application of adhesive.

FIG. 15 is a similar view to that of [FIG. 9] in which the panel system is not shown. After assembly of the first strip 1*a*, the panel system 19 and the second strip 1*b* if there is one, therefore downstream of the intake means 24 and upstream of the cheek formation station 30, the third adhesive application means 33 is used to apply adhesive to each bellows cheek 181 in four corner areas 10. The corner areas 10 are located symmetrically to the future folding crease 13. They have an isosceles right triangle shape with the right angle close to the join between the future folding crease 13 and the future crease between the central part 110 and the cheek 181. The corner areas 10 extend as far as the marking lines. After passing through the cheek formation station, the corner areas 10 are folded with the cheeks against the central part 110 of the assembly to obtain bonding in these areas. After the formation of the bag, the corner areas 10 extend to the corners of the central part 110 of the flaps between the folding crease 13 and onto said flaps 11, 12.

When opening the bag, by separating the flaps 11, 12 and deploying the bellows 18, the bonded part of the cheeks remains linked to the central part 110 between the marking lines 17 on the corner areas 10, which facilitates the formation of the rectangular-shaped bottom.

In a variant, not shown, the corner areas 10 along the same cheek on both sides of the folding crease 13 can be brought together.

What is claimed is:

1. A process for manufacturing a bag made of flexible material whereby:

- a first strip of flexible material is unreeled as a continuous sheet extending in a longitudinal direction,
- a fold is made using a folding means on the first strip along a transversal folding crease to fold a first flap onto a second flap against an internal face of the first strip, the first flap and the second flap are brought together along their edges, the strip is cut using a first cutting means by a transversal cut to form a section before or after the folding of the flaps one onto the other with the section forming the bag, a cheek and a hem are formed on each edge of the flaps before folding and adhesive is applied to the hems at least over one length of the first or second flap on one seam face using application means, a crease marking line is marked on each of the first flap and the second flap such that the folding crease is between the crease marking lines, wherein the folding brings the hem on each edge against each other and by the seam face in such a way as to obtain bonding between the hems and to bring the first and the second flaps together along the edges by means of bellows formed by the cheeks, at least one reinforcement layer is unreeled and cut using a second cutting means to obtain a system with at least one reinforcement panel, a first application of adhesive is applied using the first adhesive application means at least one of the first strip and the system with at least one reinforcement panel, before folding, the first strip and the system with at least one reinforcement panel are bonded together on the internal face of the first strip with the first application of adhesive in such a way that the system with at least one reinforcement panel is situated between the first and second flaps, and a second strip of flexible material is unreeled and a second application of adhesive is applied using a second adhesive application means, and wherein the second strip and the first strip are brought together on the internal face of the first strip with the second application of adhesive so that the second strip at least covers the system with at least one reinforcement panel and is bonded to it.

2. The process according to claim 1 whereby, width of the first and second strips are different in such a way that the hems extend from just one of said strips.

3. The process according to claim 1 whereby, width of the second strip is identical to that of the first strip.

4. A process for manufacturing a bag made of flexible material whereby:

a first strip of flexible material is unreeled as a continuous sheet extending in a longitudinal direction, a fold is made using a folding means on the first strip along a transversal folding crease to fold a first flap onto a second flap against an internal face of the first strip, the first flap and the second flap are brought together along their edges, the strip is cut using a first cutting means by a transversal cut to form a section before or after the folding of the flaps one onto the other with the section forming the bag, a cheek and a hem are formed on each edge of the flaps before folding and adhesive is applied to the hems at least over one length of the first or second flap on one seam face using application means, a crease marking line is marked on each of the first flap and the second flap such that the folding crease is between the crease marking lines, wherein the folding brings the hem on each edge against each other and by the seam face in such a way as to obtain bonding between the hems and to bring the first and the second flaps together along the edges by means of bellows formed by the cheeks, at least one reinforcement layer is unreeled and cut using a second cutting means to obtain a system with at least one reinforcement panel, a first application of adhesive is applied using the first adhesive application means at least one of the first strip and the system with at least one reinforcement panel, before folding, the first strip and the system with at least one reinforcement panel are bonded together on the internal face of the first strip with the first application of adhesive in such a way that the system with at least one reinforcement panel is situated between the first and second flaps, and wherein to form the system with at least one reinforcement panel, two reinforcement panels are successively cut and placed, one on the first flap and the other on the second flap leaving a gap between them at the folding crease.

5. A process for manufacturing a bag made of flexible material whereby:

a first strip of flexible material is unreeled as a continuous sheet extending in a longitudinal direction, a fold is made using a folding means on the first strip along a transversal folding crease to fold a first flap onto a second flap against an internal face of the first strip, the first flap and the second flap are brought together along their edges, the strip is cut using a first cutting means by a transversal cut to form a section before or after the folding of the flaps one onto the other with the section forming the bag, a cheek and a hem are formed on each edge of the flaps before folding and adhesive is applied to the hems at least over one length of the first or second flap on one seam face using application means, a crease marking line is marked on each of the first flap and the second flap such that the folding crease is between the crease marking lines, wherein the folding brings the hem on each edge against each other and by the seam face in such a way as to obtain bonding between the hems and to bring the first and the second flaps together along the edges by means of bellows formed by the cheeks, at least one reinforcement layer is unreeled and cut using a second cutting means to obtain a system with at least one reinforcement panel, a first application of adhesive is applied using the first adhesive application means at least one of the first strip and the system with at least one reinforcement panel, before folding, the first strip and the system with at least one reinforcement panel are bonded together on the internal face of the first strip with the first application of adhesive in such a way that the system with at least one reinforcement panel is situated between the first and second flaps, and using a third adhesive application means to apply adhesive to each of the cheeks or to a central part of the flaps in corner areas such that after formation of the bag the corner areas of the central part of the flaps are between the folding crease and one of the crease marking lines on the flaps.

6. The process according to claim 5 whereby, the hem is also bonded to the face opposite the seam face along just one of the elements among the first and second flaps.

7. The process according to claim 5 whereby, a crease marking line is made on each flap on both sides of the folding crease in such a way that after folding, each marking line is opposite the other one.

8. The process according to claim 5 whereby, the system with at least one reinforcement panel comprises a single panel which extends over the first and second flaps.

9. A process for manufacturing a bag made of flexible material, the process comprising:

unreeling a first strip of flexible material as a continuous sheet extending in a longitudinal direction;

folding a first flap of the first strip along a transversal folding crease onto a second flap of the first strip such that edges of the first flap and the second flap are brought together and the second flap is against an internal face of the first strip;

marking a crease marking line on each of the first flap and the second flap such that the folding crease is between the crease marking lines;

forming a cheek and a hem on each edge of the first flap and the second flap and applying a first adhesive to the hems at least over a face seam of the first flap or a face seam of the second flap before folding the first flap onto the second flap;

applying a second adhesive to each of the cheeks or to one or more corner areas of a central part of the first flap and a central part of the second flap such that after formation of the bag the corner areas of the central part of the flaps are between the folding crease and one of the crease marking lines on the flaps;

cutting the first strip along a transversal cut, before or after the folding of the flaps one onto the other, to form a section of the first strip that forms the bag;

wherein the folding of the first flap onto the second flaps brings the hem on each edge against each other so that the flaps are bonded together at the seam face to which the first adhesive is applied and the cheeks form bellows between the first flap and the second flap along the edges;

unreeling and cutting at least one reinforcement layer to form a system with at least one reinforcement panel;

applying a third adhesive to at least one of the first strip and the system with at least one reinforcement panel; and bonding the system with at least one reinforcement panel on the internal face of the first strip with the third adhesive before folding the first flap onto the second flap such that the system with at least one reinforcement panel is on the first flap or the second flap.

* * * * *